United States Patent [19]

Masuda et al.

[11] Patent Number: 4,740,546
[45] Date of Patent: Apr. 26, 1988

[54] AQUEOUS DISPERSION OF VINYL COPOLYMER RESIN

[75] Inventors: Tsuyoshi Masuda; Zengo Ninomiya, both of Sakai, Japan

[73] Assignee: Dainippon Ink and Chemicals, Inc., Tokyo, Japan

[21] Appl. No.: 58,785

[22] Filed: Jun. 5, 1987

Related U.S. Application Data

[63] Continuation-in-part of Ser. No. 679,650, Dec. 10, 1984, abandoned.

[30] Foreign Application Priority Data

Dec. 16, 1983 [JP] Japan ................................ 58-237462

[51] Int. Cl.$^4$ .............................................. C08K 5/10
[52] U.S. Cl. .................................... 524/315; 524/356; 524/366; 524/376; 524/379; 524/549; 524/555; 524/556; 524/559; 524/561; 524/562; 524/565; 524/566; 524/567; 524/568; 524/570; 524/577; 524/578; 524/811; 524/812; 524/819; 524/820; 524/823; 524/824; 524/828; 524/829; 524/831; 526/320
[58] Field of Search ............... 524/315, 356, 366, 376, 524/379, 549, 555, 556, 559, 562, 561, 565, 566, 567, 568, 570, 577, 578, 811, 812, 819, 820, 822, 823, 824, 828, 829, 831; 526/320

[56] References Cited

U.S. PATENT DOCUMENTS

| | | | |
|---|---|---|---|
| 3,073,807 | 1/1963 | Stuart et al. | 526/86 |
| 4,138,381 | 2/1979 | Chang et al. | 526/318.3 |
| 4,200,563 | 4/1980 | Komiya | 526/320 |

FOREIGN PATENT DOCUMENTS

| | | | |
|---|---|---|---|
| 0074884 | 5/1976 | Australia | 524/558 |
| 54-023640 | 2/1979 | Japan | 524/558 |
| 57-139150 | 8/1982 | Japan | 524/558 |
| 58-027771 | 2/1983 | Japan | 524/558 |

*Primary Examiner*—Joseph L. Schofer
*Assistant Examiner*—J. M. Reddick
*Attorney, Agent, or Firm*—Sherman and Shalloway

[57] ABSTRACT

An aqueous dispersion of a vinyl copolymer resin is prepared by polymerizing 1 to 15 parts by weight of a polyoxyethylene-containing hydrophilic polymerizable vinyl monomer of which polyoxyethylene moiety has an average molecular weight of 2,000 to 10,000, 99 to 85 parts by weight of at least one specific polymerizable vinyl monomer and 0 to 5 parts by weight of alpha, beta-unsaturated carboxylic acids, salts thereof or anhydrides thereof in an organic solvent, and dispersing the resulting vinyl copolymer resin solution in water.

18 Claims, No Drawings

AQUEOUS DISPERSION OF VINYL COPOLYMER RESIN

This application is a continuation-in-part of application Ser. No. 679,650, filed Dec. 10, 1984, now abandoned.

This invention relates to a new aqueous dispersion of a vinyl copolymer resin and a process for producing it. More specifically, this invention relates to a new aqueous dispersion of a vinyl copolymer not containing an emulsifier and a protective colloid normally used, and to a process for producing it.

Aqueous resins have a reduced tendency to cause pollution and are conducive to saving of resources, and because of their ease of handling and freedom from fire hazard, have attracted particular attention in recent years. The aqueous resins are usually classified into water-dissolved resins and water-dispersed resins and have their own characteristics.

The water-dissolved resins produced by neutralizing acid groups such as a carboxyl group or a sulfonic acid group of the main polymer chain with ammonia or an organic amino compound have operability, such as coatability, comparable to organic solvent-dissolved resins, and coated films therefrom have excellent gloss and corrosion resistance. However, sine they contain 30 to 50% by weight of an organic solvent, they have not proved to be satisfactory from the viewpoint of pollution control. They also have the defect of giving off offensive odors attributed to ammonia or the organic amine, having poor drying property and giving coated films with inferior water resistance. Futhermore, high-molecular-weight water-soluble resins cannot be used because increased molecular weights cause a marked rise in solution viscosity.

On the other hand, water-dispersed resins obtained by emulsion-polymerization in the presence of an emulsifier or a protective colloid or mechanically dispersing a resin are available in high molecular weight, high concentration and relatively low viscosity because the molecular weights of the polymers are not relevant to the viscosities of their aqueous dispersions. Moreover, they can be obtained by hardly using organic solvents or organic amino compounds and have excellent film drying property. However, these resins have only limited film formability. They further have the defect that the aqueous dispersions have reduced operating characteristics, such as reduced mechanical stability and miscibility with pigments, coated films thereof have reduced gloss, and moreover owing to the influences of the emulsifier or protective colloid, the coated films have inferior water resistance and corrosion resistance.

In view of the foregoing background, research works have recently been conducted on colloidal dispersion-type resins having the advantages of both of the water-soluble resins and aqueous dispersion-type resins.

It is an object of this invention to provide a novel colloidal dispersion-type aqueous resin dispersion.

The present inventors previously proposed a colloidal dispersion obtained by polymerizing a polymerizable vinyl monomer in a water-soluble solvent having a polyalkylene glycol dissolved therein and then adding water (Japanese Laid-Open Patent Publication No. 74742/1983). Further investigations have led to the discovery of a colloidal dispersion having versatility and good properties.

Thus, according to this invention, there is provided an aqueous dispersion of a vinyl copolymer resin prepared by dispersing a vinyl copolymer resin solution in water, said vinyl copolymer resin solution being obtained by polymerizing 1 to 15 parts by weight of a polyoxyethylene-containing hydrophilic polymerizable vinyl monomer of which polyoxyethylene moiety has an average molecular weight of 2,000 to 10,000, 99 to 85 parts by weight of at least one specific polymerizable vinyl monomer and 0 to 5 parts by weight of alpha, beta-unsaturated carboxylic acids, salts thereof or anhydrides thereof in an organic solvent.

According to this invention, there is also provided a process for producing the aforesaid aqueous dispersion of a vinyl copolymer resin.

The aqueous dispersion in accordance with this invention has good dispersion stability without the need for using an emulsifier or a protective colloid normally used, and coated films prepared therefrom have very good adhesion, water resistance and corrosion resistance.

The polyoxyethylene-containing hydrophilic polymerizable vinyl monomer of which polyoxyethylene moiety has an average molecular weight of 2,000 to 10,000 (to be referred to as the "polyoxyethylene-containing vinyl monomer") may, for example, be a compound represented by the following general formula

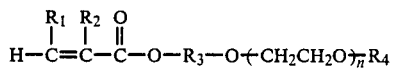

wherein each of $R_1$ and $R_2$ represents a hydrogen atom, an alkyl group having 1 to 4 carbon atoms, or a phenyl group, $R_3$ represents an alkylene group having 2 or 3 carbon atoms, $R_4$ represents a hydrogen atom or an alkyl group having 1 to 4 carbon atoms, and n represents the number of repeating oxyethylene units, or a polyoxyethylene-containing vinyl monomer containing not more than 30% by weight, based on the polyoxyethylene, of polyoxypropylene. Specific examples include compounds obtained by the addition of ethylene oxide or ethylene oxide containing not more than 30% by weight of propylene oxide to hydroxyl-containing vinyl monomers such as hydroxyethyl acrylate, beta-hydroxypropyl acrylate and beta-hydroxyethyl methacrylate; and compounds obtained by reacting polyoxyethylene glycol having an average molecular weight of 2,000 to 10,000 having H or a $C_{1-4}$ alkyl group as one terminal group and a hydroxyl as the other terminal group, or a random copolymer or graft copolymer of the aforesaid glycol and not more than 30% by weight of propylene oxide, with monocarboxylic acid vinyl monomers (such as acrylic acid, methacrylic acid, and cinnamic acid) or lower alkyl monocarboxylate vinyl monomers (such as methyl acrylate, ethyl acrylate, methyl methacrylate, propyl acrylate, butyl acrylate, methyl cinnamate and ethyl cinnamate).

The polyoxyethylene moiety of the polyoxyethylene-containing vinyl monomer should have an average molecular weight in the range of 2,000 to 10,000. If its molecular weight is less than 2,000, the resulting vinyl copolymer resin solution is difficult to disperse fully in water. If it exceeds 10,000, the amount of the vinyl group which can be copolymerized per unit molecular weight of the monomer becomes very small, and in this case, too, the water dispersibility of the resulting vinyl copolymer resin solution is markedly reduced. The average molecular weight of the polyoxyethylene moiety is preferably 3,000 to 8,000.

The amount of the polyoxyethylene-containing vinyl monomer used is 1 to 15 parts by weight per 100 parts by weight of it and the other monomer combined. If the amount of the polyoxyethylene-containing vinyl monomer is less than 1 part by weight, the water dispersibility of the resulting vinyl copolymer resin solution is not sufficient, and a stable aqueous dispersion of the copolymer is difficult to obtain. On the other hand, when it exceeds 15% by weight, the water dispersibility of the resulting vinyl copolymer resin no longer increases. This is not only uneconomical but also results in a disadvantage such as a reduction in the water resistance of the polymer. The especially preferred amount of the polyoxyethylene-containing vinyl monomer is in the range of 2 to 10 parts by weight per 100 parts by weight of it and the other monomer combined.

The at least one polymerizable vinyl monomer to be copolymerized with the polyoxyethylene-containing vinyl monomer is selected from the group consisting of (meth)acrylates such as methyl (meth)acrylate, ethyl (meth)acrylate, n-butyl (meth)acrylate, lauryl (meth)acrylate, 2-hydroxyethyl (meth)acrylate, 2-hydroxypropyl (meth)acrylate, 2-hydroxy-3-chloropropyl (meth)acrylate and glycidyl (meth)acrylate; unsaturated nitriles such as acrylonitrile and methacrylonitrile; vinyl halides such as vinyl chloride, vinylidene chloride and fluorine-containing monomers used in various water-repelling and oil-repelling agents; styrene and styrene derivatives such as alpha-methylsytrene and vinyltoluene; alpha-olefins such as ethylene; maleic esters; itaconic esters; dimethylaminoethyl methacrylate; and diethylaminoethyl methacrylate.

The alpha, beta-unsaturated carboxylic acids, salts thereof or anhydrides thereof to be optionally copolymerized with the polyoxyethylene-containing vinyl monomer and the at least one polymerizable vinyl monomer are, for example, acrylic acid, methacrylic acid, crotonic acid, sodium methacrylate, triethylammonium methacrylate, sodium maleate and maleic anhydride etc.

The copolymerization in this invention is carried out in an organic solvent. Examples of the organic solvent include aromatic hydrocarbons such as toluene and xylene; aliphatic hydrocarbons such as hexane, heptane and octane; alicyclic hydrocarbons such as cyclohexane, cyclopentane and methylcyclohexane; esters such as butyl acetate and ethyl acetate; ethers such as isopropyl ether and butyl ether; ketones such as methyl ethyl ketone and methyl isobutyl ketone; alcohols such as n-butanol, 2-butanol, propylene glycol, isopropylene glycol, methanol and ethanol; and Cellosolve solvents such as ethylene glycol monoethyl ether, ethylene glycol monobutyl ether and diethylene glycol monoethyl ether. Water-soluble organic solvents such as ethers having 1 to 4 carbon atoms, ketones having 1 to 8 carbon atoms, alcohols having 1 to 4 carbon atoms and Cellosolve solvents are preferred.

The amount of the organic solvent used is not particularly limited in this invention, but is usually 10 to 100 parts by weight per 100 parts by weight of the monomers to be copolymerized.

In the polymerization reaction for obtaining the vinyl copolymer resin solution in this invention, there may be used radical initiators, for example organic peroxides such as benzoyl peroxide, lauroyl peroxide, di-tert-butyl peroxide, tert-butyl perbenzoate, tert-butyl peroctoate and acetyl peroxide, and nitriles such as 2,2'-azobisisobutyronitrile and 2,2'-azobisvaleronitrile.

The method of preparing the vinyl copolymer resin solution is not particularly limited. For example, there can be used a method which comprises heating an organic solvent solution of the polyoxyethylene-containing vinyl monomer with stirring and simultaneously adding dropwise the radical initiator and the other polymerizable vinyl monomer; a method which comprises adding dropwise the other polymerizable vinyl monomer containing dissolved therein the radical initiator and the polyoxyethylene-containing vinyl monomer of which average molecular weight is 2,000 to 10,000 to an organic solvent being stirred; a method which comprises simultaneously adding dropwise the organic solvent, the radical initiator, the other polymerizable vinyl monomer and the hydrophilic monomer of which polyoxyethylene moiety has a molecular weight of 2,000 to 10,000; and a method which comprises polymerizing the other vinyl monomer in the organic solvent in the presence of the radical initiator, adding the polyoxyethylene-containing vinyl monomer in the latter half of the polymerization process, and cooking the mixture.

The resulting vinyl copolymer resin solution is then dispersed by adding water. Dispersion of the vinyl copolymer resin solution in water may be effected either by gradually adding the resin solution in water with stirring, or gradually adding water to the vinyl copolymer resin solution and emulsifying it. A generally preferred method comprises heating the vinyl copolymer resin solution to about 50° to 100° C., gradually adding water dropwise with good stirring, the thus emulsifying it by phase inversion because it can easily give a stable dispersion having a fine emulsion particle size.

When the vinyl copolymer resin obtained by this invention has an acid group, it may be partly or wholly neutralized with a volatile alkali such as ammonia or morpholine, as required. Neutralization can be carried out, for example, by dissolving the volatile alkali in water to be added during the preparation of the aqueous dispersion, or by adding the volatile alkali after the preparation of the aqueous dispersion.

One characteristic feature of the present invention is that an aqueous resin dispersion having anionic, nonionic or cationic property can be easily produced by choosing the type of the monomers. Moreover, by using aqueous dispersions of the resin having these various ionic properties either singly or in combination, there is a possibility of finding a variety of applications.

The aqueous dispersion of this invention has a particle diameter of usually not more than 1 micrometer, preferably not more than 0.5 micrometer, and a resin concentration of 30 to 60% by weight, preferably 35 to 50% by weight.

The aqueous dispersion of the vinyl copolymer resin obtained by this invention has superior film formability, and possesses coatability and finish gloss comparable to solvent-dissolved resins.

The aqueous dispersion of the vinyl copolymer resin can be used alone, but it is also possible to mix it with various pigments, plasticizers, solvents and coloring agents and a wide range of water-soluble or water-dispersible resins such as modified amino resins, epoxy resins, polyester resins, acrylic resins and urethane resins.

Furthermore, the aqueous dispersion of the vinyl copolymer resin in accordance with this invention can be directly kneaded with various colored pigments and extender pigments, and is characterized by the fact that as compared with ordinary emulsion polymers prepared by using emulsifiers or dispersants, it has excellent dispersion stability and mechanical stability and scarcely gives rise to a problem of foaming.

A coating composition using the aqueous dispersion of the vinyl copolymer resin in accordance with this invention can be coated by any methods, for example dipping, brush coating, spray coating or roll coating, and can exhibit excellent properties when coated on the surface of wood, paper, fibers, plastics, ceramics, inorganic cement bases, iron, non-ferrous metals.

The aqueous dispersion of the vinyl copolymer resin in accordance with this invention has excellent strippability and is useful as a strippable paint when the vinyl copolymer resin is obtained by polymerizing 1 to 15 parts by weight of the polyoxyethylene-containing vinyl monomer, 5 to 60 parts by weight of acrylonitrile and/or methacrylonitrile as the at least one polymerizable vinyl monomer and 25 to 94 parts by weight of a polymerizable vinyl monomer other than the above monomers (the total amount of the monomers is taken as 100 parts by weight).

The following examples illustrate the present invention more specifically. It should be understood that the invention is in no way limited to these examples alone. All parts in these examples are by weight.

EXAMPLE 1

A 2-liter flask equipped with a stirrer, a thermometer, a reflux condenser, a dropping funnel and an inert gas introducing inlet was charged with 300 parts of ethyl Cellosolve as a solvent and 35 parts of a polyoxyethylene-containing monomer (the polyoxyethylene moiety having an average molecular weight of 6,000) represented by the following formula

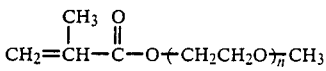

and the mixture was heated to 130° C. in a stream of nitrogen gas. Then, a vinyl monomer mixture composed of 476 parts of methyl methacrylate, 210 parts of butyl acrylate and 14 parts of methacrylic acid, and 14 parts of tertiary butyl hydroperoxide were added dropwise uniformly from separate openings to the flask over 3 hours. After the addition, the mixture was maintained further at 130° C. for 2 hours to complete the polymerization. The resulting solution was cooled to 80° C., and 615 parts of water was added dropwise at the same temperature over the course of about 2 hours. Subsequent cooling to 25° C. gave a slightly bluish aqueous dispersion of the resin. The aqueous dispersion of the resin was made alkaline by using 5% aqueous ammonia to neutralize the carboxyl groups of the polymer.

The aqueous resin dispersion had an involatile content of 44.7%, a viscosity of 110 cps, a pH of 8.2 and an average particle diameter of not more than 0.2 micrometer.

EXAMPLES 2-13 AND COMPARATIVE EXAMPLE 1-5

Aqueous dispersions of vinyl copolymer resins were produced in the same way as in Example 1 except that the kinds and amounts of the solvent and the polyoxyethylene-containing vinyl monomer, the kind of the at least one polymerizable vinyl monomer, and the kind of the alpha, beta-unsaturated carboxylic acids, salts thereof or anhydrides thereof were changed as shown in Table 1. The properties of the aqueous dispersions are also shown in Table 1.

TABLE 1

| | Example | | | | | | | | | | | | Comparative Example | | | | |
|---|---|---|---|---|---|---|---|---|---|---|---|---|---|---|---|---|---|
| | 2 | 3 | 4 | 5 | 6 | 7 | 8 | 9 | 10 | 11 | 12 | 13 | 1 | 2 | 3 | 4 | 5 |
| Monomers (parts) | | | | | | | | | | | | | | | | | |
| Methyl methacrylate | 440 | | | 310 | 440 | | 250 | 440 | 420 | 300 | | 200 | | | 440 | | |
| Styrene | | 350 | 350 | 90 | | 500 | 150 | | | 150 | 500 | 200 | 500 | 350 | | 450 | 500 |
| Butyl acrylate | | 320 | | 200 | | | 65 | | 250 | 200 | | 200 | | 320 | | | |
| Lauryl methacrylate | | | 30 | | | | 30 | | | | | | | | | | |
| Dimethyl aminomethyl methacrylate | 35 | | 5 | 10 | | | | | 30 | | | | | 35 | | | |
| 2-Ethylhexyl acrylate | 225 | 30 | 305 | 90 | 225 | 200 | 200 | 225 | | | 165 | 80 | 200 | | 225 | 240 | 200 |
| Methacrylic acid | | 30 | | | 35 | | 5 | 35 | | | | | | 30 | | 10 | |
| Acrylic acid | | | 10 | | | | | | | | | | | | | | |
| Sodium methacrylate | | | | | | | | | 30 | | | | | | | | |
| Triethylammonium methacrylate | | | | | | | | | | 20 | | | | | | | |
| Sodium maleate | | | | | | | | | | | 35 | | | | | | |
| Maleic anhydride | | | | | | | | | | | | 20 | | | | | |
| Solvents (parts) | | | | | | | | | | | | | | | | | |
| Ethyl Cellosolve | 300 | | | 300 | 300 | | 500 | 150 | 300 | 200 | | 150 | | | 300 | 300 | |
| Butyl Cellosolve | | | 400 | | | 300 | 150 | | | 100 | 300 | 150 | 300 | | | | 300 |
| Methyl isobutyl ketone | | 300 | | | | | | | | | | | | 300 | | | |
| Type of the polyoxyethylene containing vinyl monomer* | I | I | II | I | I | III | IV | V | I | II | I | I | II | I | I | VI | VII |
| Amount (parts) | 21 | 14 | 49 | 35 | 70 | 35 | 42 | 35 | 35 | 20 | 28 | 42 | 3.5 | 4.9 | 140 | 42 | 70 |
| Polymerization initiator | tert-Butyl peroxy-2-ethyl hexanoate | | **AIBN | tert-Butyl peroxy-2-ethyl hexanoate | | | | | | | | | tert-Butyl peroxy-2-ethyl hexanoate | | | | |
| Amount of water added (parts) | 580 | 575 | 720 | 590 | 640 | 600 | 613 | 590 | 580 | 575 | 580 | 590 | 550 | 560 | 730 | 614 | 650 |

| | Example | | | | | | | | | | | | Comparative Example | | | | |
|---|---|---|---|---|---|---|---|---|---|---|---|---|---|---|---|---|---|
| | 2 | 3 | 4 | 5 | 6 | 7 | 8 | 9 | 10 | 11 | 12 | 13 | 1 | 2 | 3 | 4 | 5 |

TABLE 1-continued

| Properties of the aqueous dispersion | | | | | | | | | | | | | | | | | |
|---|---|---|---|---|---|---|---|---|---|---|---|---|---|---|---|---|---|
| Dispersibility | ⦿ | ⦿ | ⦿ | ⦿ | ⦿ | ⦿ | ⦿ | ⦿ | ⦿ | ⦿ | ⦿ | ⦿ | Non-dispersible | Dispersed, but many aggregates existed. Tended to be thick | Phase inversion occurred, but the viscosity high | Non-dispersible | Poor dispersion, many aggregates |
| Non-volatile content (%) | 45.1 | 44.7 | 40.2 | 44.1 | 45.5 | 46.3 | 40.5 | 40.4 | 45.1 | 45.7 | 44.3 | 44.0 | — | — | 45.3 | — | — |
| pH | 9.2 | 3.1 | 6.3 | 9.8 | 2.4 | 6.5 | 5.6 | 6.4 | 6.8 | 7.5 | 7.5 | 4.4 | — | — | 9.6 | — | — |
| Viscosity (cps at 25° C.) | 110 | 1410 | 1250 | 430 | 160 | 120 | 460 | 870 | 390 | 770 | 640 | 1100 | — | — | 38000 | — | — |
| Particle diameter (μm) | 0.2> | 0.2> | 0.2> | 0.2> | 0.2> | 0.5> | 0.2> | 0.2> | 0.2> | 0.2> | 0.2> | 0.2> | — | — | 0.2> | — | — |
| Stability on standing | ⦿ | ⦿ | ⦿ | ⦿ | ⦿ | ⦿ | ⦿ | ⦿ | ⦿ | ⦿ | ⦿ | ⦿ | — | — | ⦿ | — | — |
| Others | | | | | | | | | | | | | | Poor water resistance of the film | | | |

(Note)
*Type of the polyoxyethylene-containing vinyl monomer

I 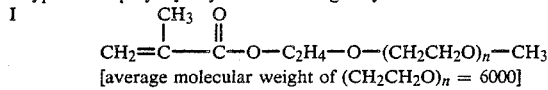
[average molecular weight of $(CH_2CH_2O)_n = 6000$]

II 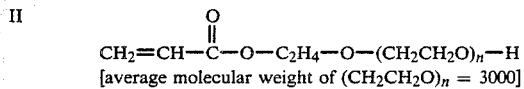
[average molecular weight of $(CH_2CH_2O)_n = 3000$]

III 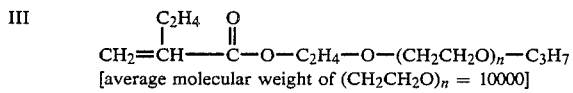
[average molecular weight of $(CH_2CH_2O)_n = 10000$]

IV 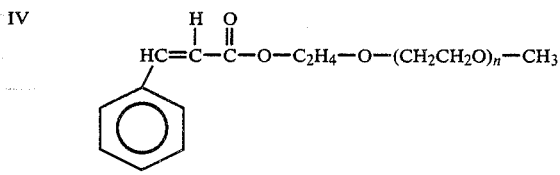
[average molecular weight of $(CH_2CH_2O)_n = 2000$]

V 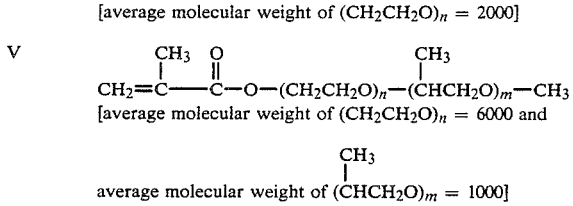
[average molecular weight of $(CH_2CH_2O)_n = 6000$ and average molecular weight of $(\underset{\underset{CH_3}{|}}{C}HCH_2O)_m = 1000$]

VI 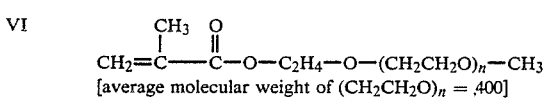
[average molecular weight of $(CH_2CH_2O)_n = 400$]

VII 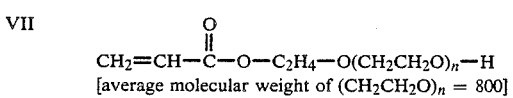
[average molecular weight of $(CH_2CH_2O)_n = 800$]

**Azobisisobutyronitrile

COMPARATIVE EXAMPLE 6

An emulsion polymer was produced from the following materials by an ordinary emulsion polymerization process.

| | Parts |
|---|---|
| Methyl methacrylate | 476 |
| Butyl acrylate | 210 |
| Methacrylic acid | 14 |

-continued

|  | Parts |
|---|---|
| Sodium dodecylbenzenesulfonate | 28 |
| Ammonium persulfate | 2.1 |
| Deionized water | 1094.8 |
| Total | 1824.9 |

The resulting emulsion had a nonvolatile content of 40.2%, a viscosity of 215 cps and a pH of 3.6.

COMPARATIVE EXAMPLE 7

Polymerization was carried out by an ordinary method by using the following materials in a solvent. The product was neutralized and diluted with water to prepare a water-soluble resin.

|  | Parts |
|---|---|
| Methyl methacrylate | 350 |
| Butyl acrylate | 280 |
| Methacrylic acid | 70 |
| Butyl Cellosolve | 490 |
| tert-Butyl peroxybenzoate | 7 |
| Triethylamine | 84 |
| Deionized water | 490 |
| Total | 1771 |

The resulting water-soluble resin had a non-volatile content of 40.3%, a viscosity of 24300 cps and a pH of 9.4.

A paint was prepared from each of the resin dispersions of the invention obtained in Example 1 to 3 and 9, the emulsion polymer obtained in Comparative Example 6 and the water-soluble resin obtained in Comparative Example 7. The properties of a coated film prepared from it were tested, and the results are shown in Table 2.

(1) The paint was a white enamel having 50% PWC ($TiO_2$).
(2) A treated steel plate (Bondelite #1077) was used as a substrate for coating.
(3) Drying of the coated film was carried out in a hot air circulating-type dryer at 70° C. for 30 minutes.

EXAMPLE 14

A 2-liter flask equipped with a stirrer, a thermometer, a reflux condenser, a dropping funnel and an inert gas introducing inlet was charged with 300 parts of ethyl Cellosolve as a solvent and then with 35 parts of a methacrylic ester derivative having a methoxy group at the terminal and of which polyoxyethylene moiety had an average molecular weight of 6,000. Under a nitrogen gas stream, they were heated to 130° C. Then, a monomeric mixture composed of 210 parts of acrylonitrile and 490 parts of butyl acrylate and 14 parts of tertiary butyl hydroperoxide were added dropwise uniformly to the flask over 3 hours from separate openings. After the addition, the mixture was maintained at 130° C. for 5 hours to complete the polymerization.

The resulting solution was cooled to 80° C., and 615 parts of water was added dropwise at the same temperature over 6 hours. Thereafter, the mixture was cooled to 25° C. to give a slightly bluish uniform aqueous resin dispersion. The resulting dispersion had a nonvolatile content of 45.2%, a viscosity of 563 cps, a pH of 6.5 and an average particle diameter of not more than 0.2 micrometer.

The resulting aqueous acrylic resin dispersion was spray-coated on an iron plate on which an aminoalkyd resin had been coated and baked. By spontaneous drying, a coated film having a thickness of 0.1 mm was formed.

The mechanical properties of the resulting coated film were measured, and the results were as follows.

TABLE 2

| Test items | Example 1 | Example 2 | Example 3 | Example 9 | Comparative Example 6 | Comparative Example 7 |
|---|---|---|---|---|---|---|
| Gloss (60°) (*1) | 86 | 87 | 85 | 87 | 53 | 85 |
| Pencil hardness (*1) | HB | HB | HB | H | H | HB |
| Crosscut (100/100 cellophane tape) (*1) | 98/100 | 96/100 | 95/100 | 98/100 | 30/100 | 97/100 |
| Erichsen (mm) (*1) | 7< | 7< | 7< | 7< | 7< | 7< |
| Water resistance (7 days) (*2) | ◉ - ○ | ◉ | ◉ | ◉ - ○ | Δ | X |
| Moisture resistance (50° C., 95% RH, 2 days) (*3) | ○ | ○ | ○ | ○ | Δ | Δ |
| Gasoline resistance (regular 30 minutes) (*4) | ○-Δ | Δ | Δ | ○ | X | X |
| Salt spray resistance (3 days) (*1) | ○-Δ | ○-Δ | ○-Δ | ○-Δ | X | Δ |

(Note): Evaluation:
◉: Very good,
○: Good,
Δ: Slightly good,
X: poor
(*1): Measured in accordance with JIS K-5400
(*2): The coated film was immersed in water at room temperature for 7 days and then its surface condition was observed.
(*3): The coated film was left to stand in an atmosphere kept at a temperature of 50° C. and a humidity of 95% for 2 days, and then its surface condition was observed.
(*4): The coated film was immersed in commercial regular gasoline for 30 minutes, and then its surface condition was observed.

| | |
|---|---|
| 100% Modulus (kg/cm$^2$) (*1): | 38 |
| Tensile strength (kg/cm$^2$) (*1): | 110 |
| Elongation (%) (*1): | 390 |
| Peel strength (g/2 cm wide) (*2): | 20 |
| The percents in the modulus and elongation were based on the length of the sample. | |

(*1): Measured at a pulling speed of 200 mm/min. in an atmosphere kept at a temperature of 25° C. and a humidity of 60% using "Autograph S 100 C" (made by Shimadzu Seisakusho Co., Ltd.).

(*2): A part of the film having a width of 2 cm was peeled in a direction of 180 degrees at a pulling speed of 200 mm/min. using the above tester, and the strength of peeling at this time was measured.

The above data demonstrate that this coated film has excellent mechanical properties and little tackiness and was very superior as a strippable film. When the above sample was exposed outdoors for half a year. The film could be easily stripped off from the coated surface, and its mechanical properties were hardly deteriorated. Furthermore, no damage was observed on the coated surface from which the film was stripped off.

What is claimed is:

1. An aqueous dispersion of a vinyl copolymer resin prepared by dispersing a vinyl copolymer resin solution in water, said vinyl copolymer resin solution being obtained by polymerizing 1 to 15 parts by weight of a polyoxyethylene-containing hydrophilic polymerizable vinyl monomer of which polyoxyethylene moiety has an average molecular weight of 2,000 to 10,000, 99 to 85 parts by weight of at least one polymerizable vinyl monomer selected from the group consisting of (meth-)acrylates, unsaturated nitriles, vinyl halides, styrene or styrene derivatives, alpha-olefins, maleic esters, itaconic esters, dimethylaminoethylmethacrylate and diethylaminoethyl methacrylate, and 0 to 5 parts by weight of alpha, beta-unsaturated carboxylic acids, salts thereof or anhydrides thereof, in an organic solvent.

2. The aqueous dispersion of claim 1 wherein the polyoxyethylene-containing hydrophilic polymerizable vinyl monomer is represented by the following general formula

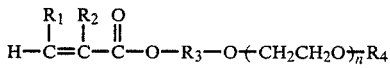

wherein each of $R_1$ and $R_2$ represents a hydrogen atom, an alkyl group having 1 to 4 carbon atoms, or a phenyl group, $R_3$ represents an alkylene group having 2 or 3 carbon atoms, $R_4$ represents a hydrogen atom or an alkyl group having 1 to 4 carbon atoms, and n represents the number of repeating oxyethylene units.

3. The aqueous dispersion of claim 1 wherein the polyoxyethylene-containing hydrophilic polymerizable vinyl monomer contains not more than 30% by weight, based on the polyoxyethylene, of polyoxypropylene.

4. The aqueous dispersion of claim 1 wherein the vinyl copolymer resin solution is obtained by polymerizing 2 to 10 parts by weight of the polyoxyethylene-containing hydrophilic polymerizable vinyl monomer and 98 to 90 parts by weight of the at least one polymerizable vinyl monomer.

5. The aqueous dispersion of claim 1 wherein the vinyl copolymer resin solution is obtained by polymerizing the polyoxyethylene-containing hydrophilic polymerizable vinyl monomer and the at least one polymerizable vinyl monomer in an amount of 100 parts by weight in total in 10 to 100 parts by weight of the organic solvent.

6. The aqueous dispersion of claim 1 which contains 30 to 60% by weight of the vinyl copolymer resin.

7. A process for producing an aqueous dispersion of a vinyl copolymer resin, which comprises polymerizing 1 to 15 parts by weight of a polyoxyethylene-containing hydrophilic polymerizable vinyl monomer of which polyoxyethylene moiety has an average molecular weight of 2,000 to 10,000, 99 to 85 parts by weight of at least one polymerizable vinyl monomer selected from the group consisting of (meth)acrylates, unsaturated nitriles, vinyl halides, styrene or styrene derivatives, alpha-olefins, maleic esters, itaconic esters, dimethylaminoethyl methacrylate and diethylaminoethyl methacrylate, and 0 to 5 parts by weight of alpha, beta-unsaturated carboxylic acids, salts thereof or anhydrides thereof, in an organic solvent, adding water to the resulting vinyl copolymer resin solution and mixing them.

8. The process of claim 7 wherein the polyoxyethylene-containing hydrophilic polymerizable vinyl monomer is represented by the following general formula

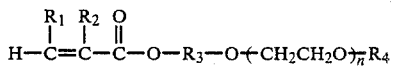

wherein each of $R_1$ and $R_2$ represents a hydrogen atom, an alkyl group having 1 to 4 carbon atoms, or a phenyl group, $R_3$ represents an alkylene group having 2 or 4 carbon atoms, $R_4$ represents a hydrogen atom or an alkyl group having 1 to 4 carbon atoms, and n represents the number of repeating oxyethylene units.

9. The process of claim 7 wherein the polyoxyethylene-containing hydrophilic polymeric vinyl monomer contains not more than 30% by weight, based on the polyoxyethylene, of polyoxypropylene.

10. A paint comprising the aqueous dispersion of claim 1 as a main component.

11. The aqueous dispersion of claim 1 wherein the polyoxyethylene-containing hydrophilic polymerizable vinyl monomer is selected from the group consisting of compounds obtained by the addition of ethylene oxide or ethylene oxide containing not more than 30% by weight of propylene oxide to hydroxyethyl acrylate, beta-hydroxypropyl acrylate or beta-hydroxyethyl methacrylate; and compounds obtained by reacting polyoxyethylene glycol having an average molecular weight of 2,000 to 10,000 having H or a $C_{1-4}$ alkyl group as one terminal group and a hydroxyl as the other terminal group, or a random copolymer or graft copolymer of the aforesaid glycol and not more than 30% by weight of propylene oxide, with acrylic acid, methacrylic acid, cinnamic acid, methyl acrylate, ethyl acrylate, methyl methacrylate, propyl acrylate, butyl acrylate, methyl cinnamate or ethyl cinnamate.

12. The aqueous dispersion of claim 1 wherein the polyoxyethylene moiety has an average molecular weight of from 3,000 to 8,000.

13. The aqueous dispersion of claim 1 wherein the at least one polymerizable vinyl monomer comprises an alpha, beta-unsaturated carboxylic acid or salt thereof.

14. The aqueous dispersion of claim 1 wherein the organic solvent is selected from the group consisting of aromatic hydrocarbons, aliphatic hydrocarbons, alicyclic hydrocarbons, esters, ethers, ketones, alcohols, and Cellosolve solvents.

15. The aqueous dispersion of claim 1 wherein the organic solvent is selected from the group consisting of ethers having 1 to 4 carbon atoms, ketones having 1 to 8 carbon atoms, alcohols having 1 to 4 carbon atoms, and Cellosolve solvents.

16. The aqueous dispersion of claim 1 wherein the organic solvent is selected from the group consisting of ethylene glycol monoethyl ether, ethylene glycol monobutyl ether and diethylene glycol monoethyl ether.

17. A self-dispersing, film-forming aqueous dispersion comprising a vinyl copolymer resin-organic solvent solution dispersed in water, said vinyl copolymer resin comprising a copolymer of 2 to 10 parts by weight of a polyoxyethylene-containing hydrophilic polymerizable vinyl monomer, the polyoxyethylene moiety of which has an average molecular weight of 2,000 to 10,000, 98 to 90 parts by weight of at least one polymerizable vinyl monomer selected from the group consisting of (meth-)acrylates, unsaturated nitriles, vinyl halides, styrene or styrene derivatives, alpha-olefins, maleic esters, itaconic esters, dimethylaminoethyl methacrylate and diethylaminoethyl methacrylate, and 0 to 5 parts by weight of alpha, beta-unsaturated carboxylic acids, salts thereof or anhydrides thereof, said dispersion containing from 30 to 60% by weight of the vinyl copolymer resin in the form of dispersed particles having a particle diameter of not more than about 0.5 micrometers.

18. A coating composition comprising the aqueous dispersion of claim 17 and pigment.

* * * * *